(12) United States Patent
Garcia Grau et al.

(10) Patent No.: US 11,383,447 B2
(45) Date of Patent: Jul. 12, 2022

(54) THREE-DIMENSIONAL OBJECT PRODUCTION

(71) Applicant: HEWLETT-PACKARD DEVELOPMENT COMPANY, L.P., Spring, TX (US)

(72) Inventors: Marc Garcia Grau, Sant Cugat del Valles (ES); Isabel Sanz Ananos, Sant Cugat del Valles (ES); Alicia Oyonarte Fernandez, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/605,207

(22) PCT Filed: Jul. 31, 2018

(86) PCT No.: PCT/US2018/044499
§ 371 (c)(1),
(2) Date: Oct. 14, 2019

(87) PCT Pub. No.: WO2020/027789
PCT Pub. Date: Feb. 6, 2020

(65) Prior Publication Data
US 2021/0331401 A1    Oct. 28, 2021

(51) Int. Cl.
*B29C 64/393*    (2017.01)
*B29C 64/307*    (2017.01)
(Continued)

(52) U.S. Cl.
CPC .......... *B29C 64/393* (2017.08); *B29C 64/307* (2017.08); *B33Y 30/00* (2014.12); *B33Y 40/20* (2020.01)

(58) Field of Classification Search
None
See application file for complete search history.

(56) References Cited

U.S. PATENT DOCUMENTS 9,827,717 B2    11/2017    Huang et al.
9,931,697 B2    4/2018    Levin et al.
(Continued)

FOREIGN PATENT DOCUMENTS

CN    107206690 A    9/2017
CN    107430592 A    12/2017
(Continued)

*Primary Examiner* — Yung-Sheng M Tsui
(74) *Attorney, Agent, or Firm* — HP Inc. Patent Department

(57) ABSTRACT

A non-transitory machine-readable storage medium storing instructions executable a processor is described. In some examples, the instructions cause the processor to receive object data representing an object to be manufactured by an additive manufacturing process. The object data comprises data representing a plurality of planar surfaces of the object. The object data is processed to determine, for each of the plurality of planar surfaces, an angle between the respective planar surface and a plane of a reference surface of an additive manufacturing apparatus. A manufacturing orientation of the object is selected on the basis of the angles determined for the plurality of planar surfaces and a further property of the object different to the determined angles.

15 Claims, 7 Drawing Sheets

(51) Int. Cl.
*B33Y 30/00* (2015.01)
*B33Y 40/20* (2020.01)

(56) References Cited

U.S. PATENT DOCUMENTS

| | | |
|---|---|---|
| 2002/0104973 A1 | 8/2002 | Kerekes |
| 2007/0233298 A1 | 10/2007 | Heide et al. |
| 2015/0258736 A1 | 9/2015 | Chen et al. |
| 2016/0250810 A1* | 9/2016 | Lynch August ...... B29C 64/393 700/98 |
| 2016/0263838 A1 | 9/2016 | Goldman et al. |
| 2016/0320771 A1 | 11/2016 | Huang |
| 2017/0203515 A1 | 7/2017 | Bennett et al. |
| 2017/0277168 A1 | 9/2017 | Tanaka et al. |
| 2018/0095450 A1 | 4/2018 | Lappas et al. |
| 2018/0117850 A1 | 5/2018 | Schwartz et al. |

FOREIGN PATENT DOCUMENTS

| | | |
|---|---|---|
| EP | 1775104 A1 | 4/2007 |
| EP | 3305511 A1 | 10/2016 |
| EP | 3305510 A1 | 4/2018 |
| WO | WO2017019100 A1 | 2/2017 |

* cited by examiner

400

```
┌─────────────────────────────────────┐
│ Receiving object data representing  │
│ an object to be manufactured by an  │
│ additive manufacturing process, the │
│ object data comprising data         │
│ representing a plurality of planar  │
│ surfaces of the object              │
│ 402                                 │
└─────────────────────────────────────┘
                  │
                  ▼
┌─────────────────────────────────────┐
│ Iteratively processing the object   │
│ data to generate a plurality of     │
│ values of an orientation parameter, │
│ each of the plurality of values     │
│ corresponding to a respective       │
│ candidate manufacturing orientation │
│ of a plurality of candidate         │
│ manufacturing orientations of the   │
│ object, the plurality of values     │
│ being determined based on at least  │
│ two of:                             │
│ orientations of respective planar   │
│ surfaces of the object when the     │
│ object has a respective             │
│ orientation;                        │
│ an extent of the object in a        │
│ direction perpendicular to a plane  │
│ of a reference of an additive       │
│ manufacturing apparatus when the    │
│ object has a respective             │
│ orientation;                        │
│ a two-dimensional extent of the     │
│ object parallel to the plane of the │
│ reference surface when the object   │
│ has a respective orientation;       │
│ and                                 │
│ a tensile strength of the object in │
│ a direction parallel to the plane   │
│ of the reference surface when the   │
│ object has a respective orientation │
│ 404                                 │
└─────────────────────────────────────┘
                  │
                  ▼
┌─────────────────────────────────────┐
│ Select a preferred manufacturing    │
│ orientation of the object based on  │
│ the plurality of values             │
│ 406                                 │
└─────────────────────────────────────┘
```

Figure 4

THREE-DIMENSIONAL OBJECT PRODUCTION

BACKGROUND

Apparatus that generate three-dimensional objects, including those commonly referred to as "3D printers", may be used to produce a wide-range of three-dimensional objects. These apparatus typically receive a definition of the three-dimensional object in the form of an object model. This object model is processed to instruct the apparatus to produce the object using a production material. This may be performed on a layer-by-layer basis. The processing of the object model may vary based on the type of apparatus and/or the production technology being implemented. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein:

FIG. 4 is a flow diagram showing a method for selecting a manufacturing orientation of an object to be formed by an additive manufacturing apparatus according to an example;

DETAILED DESCRIPTION

Figure 1:
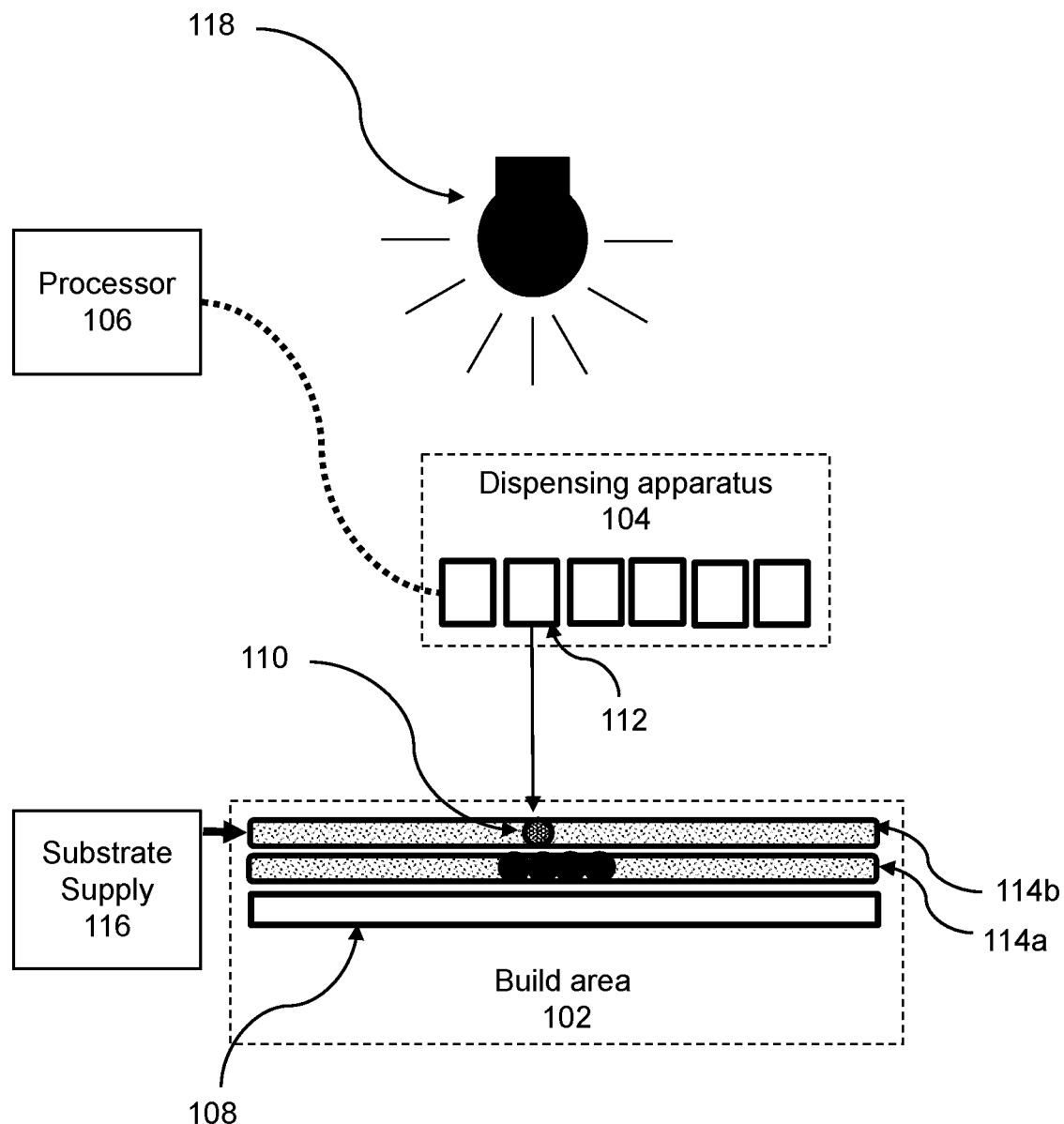
FIG. 1 is a schematic diagram of an apparatus to produce a three-dimensional object according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In the production of three-dimensional objects, e.g. in additive manufacturing processes such as so-called "3D printing", there is a challenge to control the dimensions of generated objects. It may also be desirable to control the surface finish or texture of produced objects.

Like any manufacturing process, when designing a product that is to be produced by additive manufacturing process, there are economic and schedule constraints that affect the design of the product. In the case of additive manufacturing processes, there may be constraints relating to the orientation of the product (i.e. the object to be manufactured). For example, the time it takes to manufacture a given object using a layer-by-layer process is inversely proportional to the overall height of the manufactured object. Furthermore, additive manufacturing is a process by which objects may be formed layer-by-layer, and accordingly the layered nature of the manufactured object may have an effect on the resulting product, which may therefore present additional design constraints in order to deliver a product that meets design expectations in terms of providing a stable and repeatable manufacturing process stability and produces a part with the desired appearance (i.e. surface finish) and mechanical properties.

In the case of additive manufacturing processes, the inventors have appreciated that decisions made early in the design of a part to manufactured by additive manufacturing can have a significant effect on the cost (in terms of materials and time).

The present disclosure provides a process by which part quality may be improved early in the design process to reduce material costs and improve the quality (e.g. surface finish and process stability) of an object produced by an additive manufacturing process. This may increase the probability that an object is produced to specification (i.e. meeting specified tolerances) and may reduce the probability of producing objects that fail to meet design specifications. It may also provide a process by which mechanical properties and/or appearance (e.g. surface properties) of the manufactured object are improved. It may also provide a process by which an object may be manufactured using a reduced number of substrate layers, thereby reducing the time taken to manufacture the object.

In turn, as well as improving performance of additive manufacturing processes for established applications, such as prototyping and low-volume production runs (e.g. for specific small volume markets), the processes disclosed herein may provide improvements that enable the use of additive manufacturing processes to replace existing production processes.

Certain examples described herein facilitate manufacture of a three-dimensional object with desired dimensions and/or a desired surface finish to be produced in a printing operation.

The methods described herein and the disclosed algorithms that implement those methods, may provide feedback which enables designers of objects to be manufactured by an additive manufacturing process to improve their designs, to select an appropriate orientation of the object for manufacture, and to check that the specified sizes of features in the design will, for the selected additive manufacturing process, result in the desired outcome. For example, the algorithm may check that minimum feature sizes attainable by a specific additive manufacturing process are not breached by the design, that the area of the design in which artefacts such as stair stepping may be exhibited are reduced. In examples where the object may be manufactured using a reduced number of substrate layers the time taken to manufacture the object may be reduced. Furthermore, the methods described herein and the disclosed algorithms that implement those methods may enable the designer to take account of processing steps that are to be performed after the manufacture of the object by the additive manufacturing process.

Presently, in the field of additive manufacturing, there exist algorithms for analyzing and adjusting part orientation to reduce material usage or to reduce manufacture time. Such algorithms are to orientate an object to be manufactured to reduce the height of the object with respect to the apparatus used for manufacture, to reduce the number of layers that need to be formed and therefore reduce the time taken to manufacture the part. However, such algorithms do not consider other factors which influence the quality of the resulting manufactured object.

The algorithms disclosed herein take account of other factors affecting the quality of the resulting manufactured object at the design stage and therefore in addition to reducing the material costs and manufacture time, also improves the quality of the manufacture object, by selecting an appropriate orientation for manufacture of the object.

An example of an artefact that may be detrimental to the result of an additive manufacturing process is so-called stair stepping. Stair stepping is an effect that is manifested by producing a stepped surface where a smooth surface is specified. For example, the design of a three-dimensional object may specify a surface the dimensions of which vary in the z-axis in a regular or continuous manner. However, due to limitations of the printing apparatus, the resulting product may exhibit stepped features rather than the specified continuous surface. In particular, the printing apparatus may be arranged to from a three-dimensional object by progressive deposition of layers of material having a discrete thickness. In combination with that discrete thickness, the mechanism for solidifying the substrate material, to form the three-dimensional object, also has a finite resolution. The net result of these limitations is that, in some circumstances, when forming a surface which is intended to be smooth but is neither vertical nor horizontal with respect to the plane of the platen 108 (such as, for example, a smooth slope), the result can include steps at the interface between layers of substrate material.

Stair stepping artefacts are a function of the angle between a surface of the manufactured object and a plane of a build surface. For example, surfaces of a printed object that are vertical (i.e. perpendicular to the build surface) may exhibit little or no stair stepping. Similarly, surfaces that are horizontal (i.e. parallel to the build surface) may exhibit little or no stair stepping. However, surfaces that are within a range of angles that is dependent on the thickness of the layers of substrate material may exhibit a greater degree of stair stepping. The degree of stair stepping may also depend on whether a surface is orientated to face away from the build surface or orientated to face toward the build surface. The degree of stair stepping may also depend on the properties of the build material.

For example, fora plastics material with a substrate layer thickness of 80 microns, a high degree of stair stepping may be exhibited for surface features orientated to face away from the build surface with an angle relative to the build surface greater than 0° and less than approximately 16°, and a relatively lower (but still visible) degree of stair stepping may be exhibited for surface features orientated to face away from the build surface with an angle relative to the build surface in the approximate range 16° to 20°. For a plastics material with a substrate layer thickness of 80 microns, a high degree of stair stepping may be exhibited for surface features orientated to face toward the build surface with an angle relative to the build surface greater than 0° and less than approximately 4°, and a relatively lower (but still visible) degree of stair stepping may be exhibited for surface features orientated to face toward the build surface with an angle relative to the build surface in the approximate range 4° to 6°.

A stair stepping angle may be defined as an angle relative to the build surface below which stair stepping appears (i.e. corresponding to the upper limits of the ranges described above). For surface features orientated to face away from the build surface, the stair stepping angle may vary from approximately 15° for a plastics material with a substrate layer thickness of 60 microns to approximately 30° for a plastics material with a substrate layer thickness of 120 microns. For surface features orientated to face toward the build surface, the stair stepping angle may vary from approximately 3° for a plastics material with a substrate layer thickness of 60 microns to approximately 7° for a plastics material with a substrate layer thickness of 120 microns.

An example of an apparatus to produce a three-dimensional object will now be described with reference to FIG. 1. FIG. 1 shows an example of an apparatus 100 to produce a three-dimensional object 110. The apparatus 100 may comprise a so-called "3D printer". The apparatus 100 comprises a build area 102, a dispensing apparatus 104, and a processor 106.

Although, for ease of understanding, the present disclosure is made with reference to a particular method of additive manufacturing, the principles disclosed herein are generally application to any additive manufacturing process.

The build area 102 may comprise a platen 108 upon which a three-dimensional object 110 may be constructed. The platen 108 may define a two-dimensional surface that acts as a reference plane for a coordinate system defined for the apparatus 100. For example, the platen 108 may be orientated to be horizontal and define an x-y plane in a three-dimensional coordinate system, where a third dimension representing a z-axis defines a height relative to the surface of the platen 108.

The dispensing apparatus 104 is to dispense, deposit, or otherwise apply a plurality of print agents to generate the three-dimensional object 110. The print agents may comprise, for example, clear and/or colored liquids (such as fusing or detailing agents) for use on a substrate.

According to one example, a suitable fusing agent may be an ink-type formulation comprising carbon black, such as, for example, the fusing agent formulation commercially known as V1Q60Q "HP fusing agent" available from HP Inc. In one example such a fusing agent may additionally comprise an infra-red light absorber. In one example such an ink may additionally comprise a near infra-red light absorber. In one example such a fusing agent may additionally comprise a visible light absorber. In one example such an ink may additionally comprise a UV light absorber. Examples of inks comprising visible light enhancers are dye based colored ink and pigment based colored ink, such as inks commercially known as CE039A and CE042A available from HP Inc. According to one example, a suitable detailing agent may be a formulation commercially known as V1Q61A "HP detailing agent" available from HP Inc.

In FIG. 1, the dispensing apparatus 104 is communicatively coupled to the processor 106, e.g. via a wired interface and/or via a wireless interface. The processor 106 may be programmed to control the dispensing apparatus 104 based on manufacturing control data. The manufacturing control data may indicate placement instructions for the plurality of print agents. For example, these instructions may comprise, or may be used to generate, firing signals for at least one print head 112 to deposit a particular print agent. These firing signals may be associated with a particular location in two-dimensional space.

The dispensing apparatus 104 may be moveable relative to the platen 108 in order to deposit a print agent at a particular location. The three-dimensional object 110 may be constructed layer-by-layer, in which case the dispensing apparatus 104 may deposit print agent onto each formed layer of build material. In this case, placement instructions may relate to the placement of an available print agent or print agent combination at a particular print-resolution pixel for a particular layer (e.g. to deposit a print agent composition for a voxel location associated with the layer).

The dispensing apparatus 104 may, in certain examples, comprise an inkjet deposit mechanism. In the example of FIG. 1, the apparatus is to print a plurality of liquid agents onto layers of a build material substrate 114. The build material substrate may be a particulate material, such as a powder or powder-like material. According to one example, a suitable build material may be PA12 build material commercially known as V1R10A "HP PA12" available from HP Inc. In some examples, the dispensing apparatus 104 may comprise first and second dispensers. In this example, the dispensing apparatus 104 comprises six inkjet print heads 112. Each inkjet print head 112 may be adapted to deposit a print agent onto the build material substrate 114. In particular, each inkjet print head 112 may be to deposit a particular print agent upon defined areas of a plurality of successive layers of the build material substrate 114. In one example, one print agent may act as a fusing agent, and another print agent may act or as detailing agent (i.e. a fusing inhibitor). In other examples, the dispensing apparatus 104 may deposit a print agent that acts as a fusing agent and may omit print agents that act as a detailing agent.

In FIG. 1, the apparatus 100 comprises a substrate supply mechanism 116 to supply at least one substrate layer onto which the plurality of agents may be dispensed, deposited or otherwise applied by the dispensing apparatus 104. In this example, the substrate supply mechanism 116 comprises a powdered substrate supply mechanism to supply successive layers of powdered substrate 114. Two layers are shown in FIG. 1: a first layer 114a onto which a second layer 114b has been deposited by the substrate supply mechanism 116. In certain cases, the substrate supply mechanism 116 is to move relative to the platen 108 so that successive layers may be deposited on top of each other.

In some examples, the substrate supply mechanism 116 may dispense a layer of powdered substrate 114 having a fixed thickness. In other examples, the substrate supply mechanism may dispense each layer of powdered substrate 114 according to a specified thickness and the thickness of one of the layers of powdered substrate 114 may be the same or different to one or more other layers of powdered substrate 114.

In the present example, the apparatus also comprises a fuser 118 to apply energy to form portions of the three-dimensional object from the powdered substrate 114. For example, FIG. 1 shows a particular print head 112 depositing a controlled amount of a fluid agent onto an addressable area of the second layer of powdered substrate 114b. The fluid agent is deposited onto the powdered substrate and, as such, a drop of agent on an addressable area unit of the layer relates to a print resolution voxel of an object model. The height of the voxel in its associated voxel location is determined by the depth of each layer of substrate 114. The placement instructions discussed above may control the operation of the print head 112 to form the associated voxel location. Following application of the agent, the fuser 118 is to solidify the portion of the layer of substrate 114b. For example, the fuser 118 may apply electromagnetic radiation within a wavelength range to the layer of substrate 114b. The application of electromagnetic radiation may melt, sinter or fuse the build material of the layer of substrate 114b where fusing agent has been applied. In certain examples, the fuser 118 may comprise an energy source such as a ultra-violet or infra-red light source, e.g. a lamp or laser. FIG. 1 shows four print resolution voxels locations that have been formed in the first layer 114a. As such, a voxel location in the second layer 114b may be built on voxels locations formed in the first layer 114a to build the three-dimensional object. Lower layers of the build material substrate 114 may also provide support for overhanging portions of a three-dimensional object, so that the build material substrate may be removed at the end of production to reveal the completed object.

In the example shown in FIG. 1, there may be, for example, six print agents, with each print agent having a different property. For example, four of the print agents may comprise colorants to provide a full color space for producing three-dimensional objects. One of the print agents may be a black fusing agent. One of the print agents may be a substantially colorless, or neutrally-colored, electromagnetic radiation absorbing agent. One of the print agents may be a detailing agent to cool the substrate or otherwise prevent fusion of the particulate material of the substrate.

The processor 106 may control the dispensing apparatus 104 to dispense, deposit or apply different agents in accordance with the placement instructions. In certain examples, the placement instructions may specify colors, structural properties, or other properties, to be formed in various portions of the three-dimensional object 110. The processor 106 may determine the relative amounts of different fusing agents, colorant agents, or other agents to achieve the specified properties of the manufactured object.

In some examples, the agents dispensed by the dispensing apparatus 104 may be applied on the layer of particulate build material.

Figure 2:
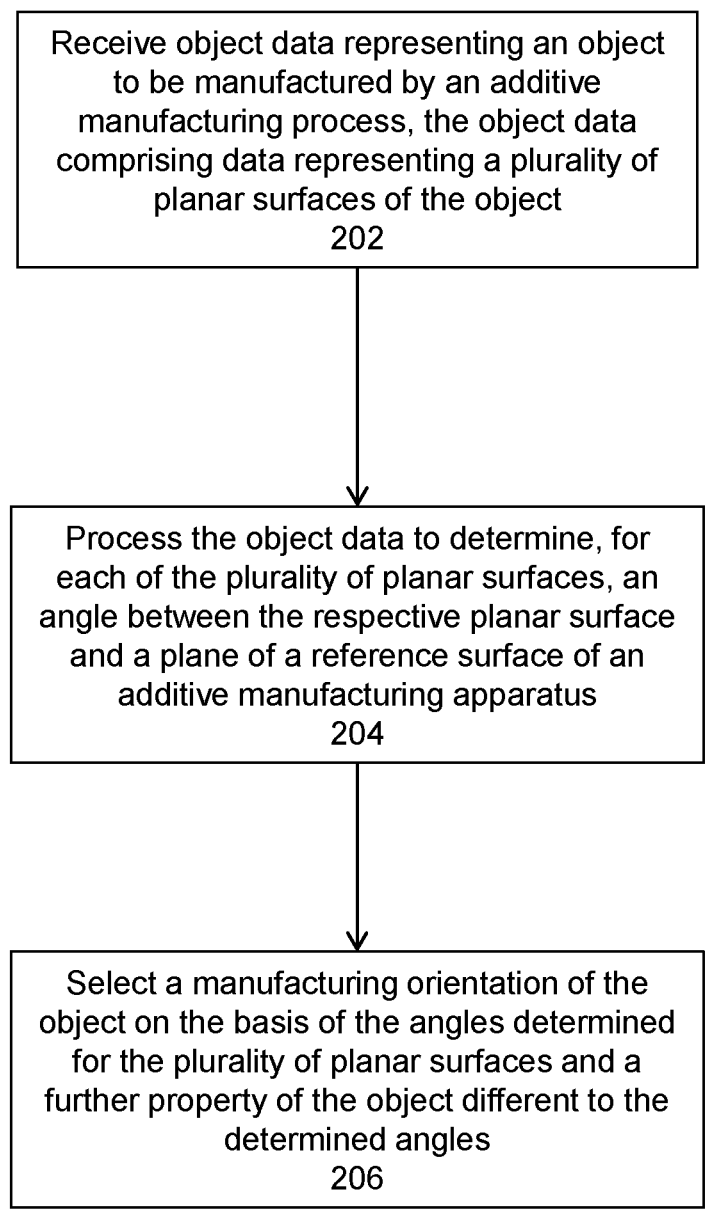
FIG. 2 is a flow diagram showing a method for selecting a manufacturing orientation of an object to be formed by an additive manufacturing apparatus according to an example.

FIG. 2 shows a method 200 for selecting a manufacturing orientation of an object to be formed by an additive manufacturing apparatus, such as the additive manufacturing apparatus shown in FIG. 1. The method 200 may be implemented by a processor, such as the processor 106 shown in FIG. 1, that processes computer program code that is retrieved from a non-transitory storage medium. Alternatively, the method may be implemented by another processor in the apparatus 100 or may be implemented by a processor of a computing device, different from the apparatus 100, the computing device sending instructions to the apparatus 100, for example.

At block 202, object data representing an object to be manufactured by an additive manufacturing process is received. The object data comprises data representing a plurality of planar surfaces of the object. For example, the object data may be in the form of a stereolithography file. Such a file may comprise data representing a plurality of planar surfaces comprising triangular segments which combine to form a surface of a three-dimensional object to be manufactured.

At block 204, the object data is processed to determine, for each of the plurality of planar surfaces, an angle between the respective planar surface and a plane of a reference surface of the additive manufacturing apparatus. For example, the reference surface of the additive manufacturing apparatus may be the platen 108 upon which the object 110 is to be manufactured.

At block 206, a manufacturing orientation of the object is selected on the basis of the angles determined for the plurality of planar surface and a further property of the object different to the determined angles. For example, the further property of the object may be one or more of: an extent of the object in a direction perpendicular to a plane of a reference of an additive manufacturing apparatus when the object has a respective orientation; a two-dimensional extent of the object parallel to the plane of the reference surface when the object has a respective orientation; and a tensile strength of the object in a direction parallel to the plane of the reference surface when the object has a respective orientation.

In some examples, the processor 106 may process the object data to define the plurality of planar surfaces in a first object orientation and determine a first area of the object affected by stair stepping based on the plurality of planar surfaces in the first object orientation. The processor may then process the object data to define the plurality of planar surfaces in a second object orientation and determine a second area of the object affected by stair stepping based on the plurality of planar surfaces in the first object orientation. The processor may then select the manufacturing orientation of the object (i.e. the orientation with respect to the platen 108) based on which of the first and second areas is lower.

In some examples, the processor may process the object data to define the plurality of planar surface in more than two object orientations and may select the manufacturing orientation based on which of a plurality of orientations results in a lowest area affected by stair stepping.

Figure 3:
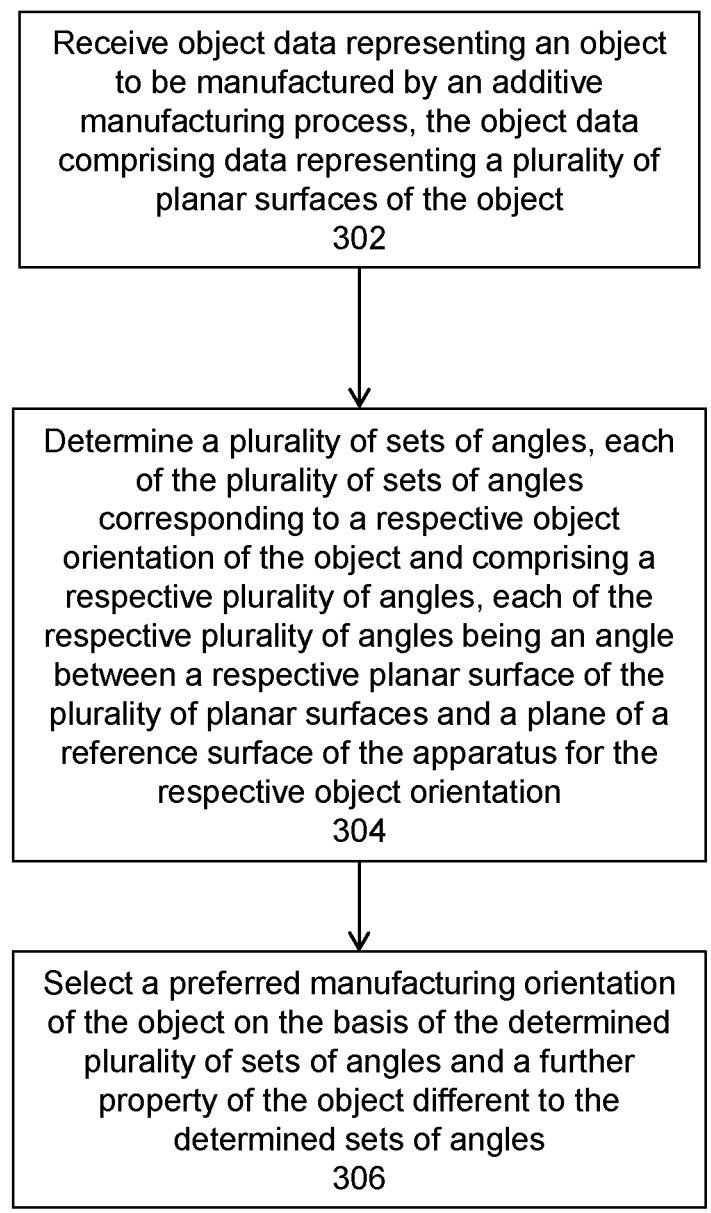
FIG. 3 is a flow diagram showing a method for selecting a manufacturing orientation of an object to be formed by an additive manufacturing apparatus according to an example.

FIG. 3 shows another method 300 of selecting a manufacturing orientation of an object. This method may also be implemented by a processor, such as the processor 106 shown in FIG. 1, that processes computer program code that is retrieved from a non-transitory storage medium. Alternatively, the method may be implemented by another processor in the apparatus 100 or may be implemented by a processor of a computing device, different from the apparatus 100, the computing device sending instructions to the apparatus 100, for example.

At block 302, object data representing an object to be manufactured by an additive manufacturing process is received. The object data represents a plurality of planar surfaces of the object.

At block 304, a plurality of sets of angles are determined. Each of the plurality of sets of angles corresponds to a respective object orientation of the object and comprises a respective plurality of angles. Each of the respective plurality of angles is an angle between a respective planar surface of the plurality of planar surfaces and a plane of a reference surface of the apparatus for the respective object orientation.

At block 306 a preferred manufacturing orientation of the object is selected on the basis of the determined plurality of sets of angles and a further property of the object different to the determined sets of angles. For example, the processor may select the manufacturing orientation based on which of the plurality of sets of angles results in a lowest area affected by stair stepping, as described above with reference to the method 200 shown in FIG. 2. The further property of the object may be, for example, one or more of: an extent of the object in a direction perpendicular to a plane of a reference of an additive manufacturing apparatus when the object has a respective orientation; a two-dimensional extent of the object parallel to the plane of the reference surface when the object has a respective orientation; and a tensile strength of the object in a direction parallel to the plane of the reference surface when the object has a respective orientation.

FIG. 4 shows another method 400 of selecting a manufacturing orientation of an object. This method may also be implemented by a processor, such as the processor 106 shown in FIG. 1, that processes computer program code that is retrieved from a non-transitory storage medium. Alternatively, the method may be implemented by another processor in the apparatus 100 or may be implemented by a processor of a computing device, different from the apparatus 100, the computing device sending instructions to the apparatus 100, for example.

At block 402, object data representing an object to be manufactured by an additive manufacturing process is received. The object data represents a plurality of planar surfaces of the object.

At block 404, the object data is iteratively processed to generate a plurality of values of an orientation parameter. Each of the plurality of values corresponds to a respective candidate manufacturing orientation of a plurality of candidate manufacturing orientations of the object. The plurality of values are determined based on orientations of respective planar surfaces of the object when the object has a respective orientation.

At block 406 a preferred manufacturing orientation of the object is selected based on the plurality of values. For example, the processor may select the manufacturing orientation based on which of the plurality of values results in a lowest area affected by stair stepping, as described above with reference to the method 200 shown in FIG. 2.

Figure 5:
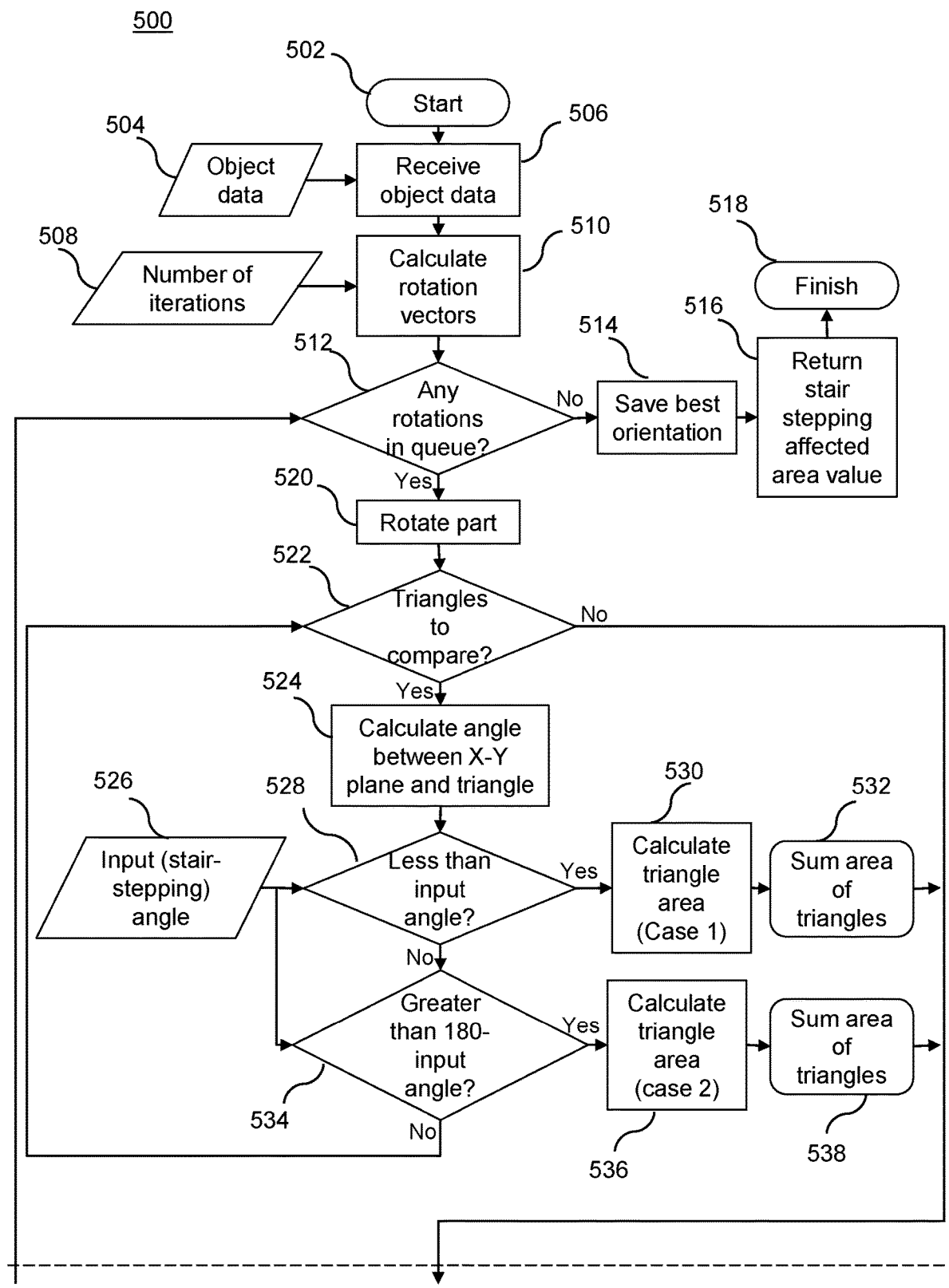
FIG. 5 is a flow diagram showing a method for selecting a manufacturing orientation of an object to be formed by an additive manufacturing apparatus according to an example.
Figure 5:
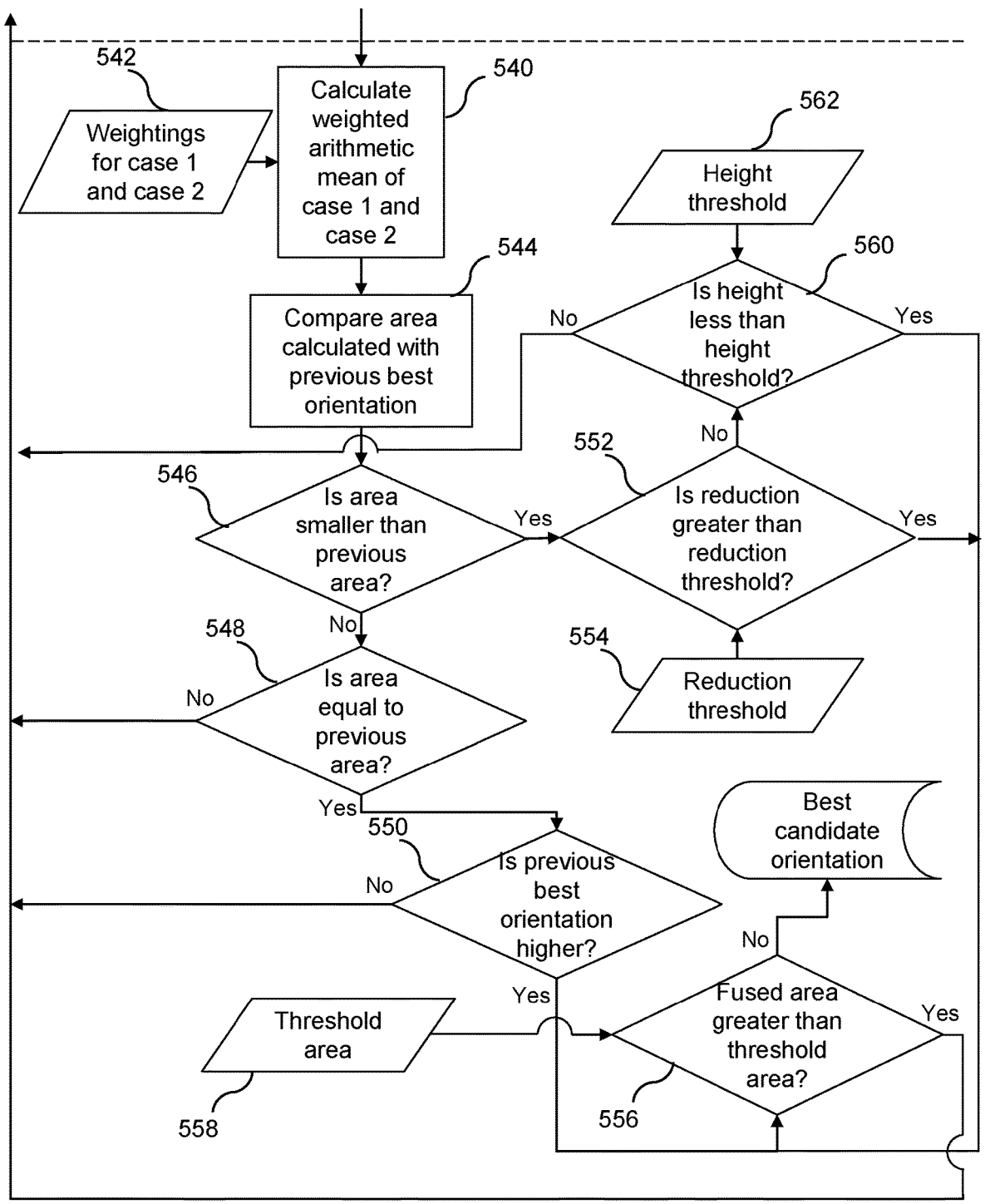

FIG. 5 is a workflow diagram showing an algorithm 500 for selecting a manufacturing orientation of an object. The algorithm 500 is a multi-objective algorithm to improve thermal stability of the additive manufacturing apparatus 100, reduce the area of a manufactured object that is affected by stair stepping, and reduce the height of a part that is to be manufactured (thereby reducing material costs and manufacture time).

The workflow starts at block 502. Object data 504 is received at block 506. The object data may, for example, be in the form of a such as a stereolithography (.STL) file or a 0.3mf file.

Based on a specified number of iterations 508, at block 510, rotation vectors for all orientations of the object that are to be evaluated are calculated.

At block 512, a determination is made as to whether there are any more orientations to evaluate. If there are no more orientations to evaluate, the best orientation is saved at block 514. For example, the best orientation may be filed as new object data in a data file, such as a stereolithography (.STL) file or a 0.3mf file. In some examples, a value representing an area affected by stair-stepping may be returned at block 516. When there are no more orientations to evaluate the process terminates at block 518.

While there are remaining orientations of the object to evaluate, the object data is processed to orientate or rotate the object to the next orientation to be evaluated at block 520.

As described above with reference to FIGS. 2 to 4, the object data may be processed to define a plurality of planar surfaces in the current orientation. For example, the object data may comprise a plurality of triangles that combine to form a surface of a three-dimensional object. At block 522 a determination is made as to whether there are any further planar surfaces (e.g. triangles) in the object data to process.

For each of the planar surfaces, an angle between the planar surface and a plane reference surface of the additive manufacturing apparatus is calculated at block 524. For example, the plane of the reference surface may be an x-y plane defined by the platen 108 of the additive manufacturing apparatus 100 described above with reference to FIG. 1. In examples where the planar surfaces are triangles, the algorithm 500 may, for example, determine a vector defining a normal to each triangle and compare that vector with a vector defining a normal to the x-y plane of the platen 108 to determine an angle between the respective vectors for each triangle.

An input angle corresponding to a stair stepping angle is received at block 526. The stair-stepping angle defines an angle below which the planar surfaces making up the three-dimensional object are likely to exhibit stair stepping. That is, the stair stepping angle defines an angle with the x-y plane of the platen 108 at which stair stepping appears (for a given layer thickness). In some examples, different layer thicknesses may produce stair stepping in different ranges of angles, as the layer thickness represents the resolution of the additive manufacturing apparatus 100 in the z (vertical) direction. In some examples, the algorithm 500 may evaluate the effect of stair stepping for different orientations for a range of layer thicknesses.

In some examples, the algorithm 500 may categorize the planar surfaces according to the likelihood that they will exhibit stair stepping. For example, the algorithm 500 may sort the planar surfaces into three categories: "high stair stepping", "low stair stepping" and "no stair stepping". Planar surfaces in the high stair stepping category represent areas of the object where stair stepping is likely to be seen in a manufactured object with high intensity and sharpness. Planar surfaces in the low stair stepping category represent areas of the object where stair stepping is likely to be seen in a manufactured object but with a low intensity and sharpness. For example, planar surfaces in the low stair stepping category may occur in areas on the underside of a manufactured object (in relation to the orientation of the platen 108). Planar surfaces in the no stair stepping category represent areas of the object where stair stepping is likely to be seen in a manufactured object.

At block 528, for each planar surface, a determination is made as to whether the angle between the planar surface and the reference plane of the additive manufacturing apparatus is less than the stair stepping angle (referred to as a first threshold angle). Planar surfaces which satisfy this condition represent planar surfaces in the high stair stepping category (referred to as case 1 in FIG. 5). For planar surfaces for which the angle between the planar surface and the reference plane of the additive manufacturing apparatus is less than the first threshold angle, the area of the planar surface is calculated at block 530. At block 532 the areas of all planar surfaces for which the angle between the planar surface and the reference plane of the additive manufacturing apparatus is less than the first threshold angle are summed.

At block 534, for each planar surface, a determination is made as to whether the angle between the planar surface and the reference plane of the additive manufacturing apparatus is greater than 180 degrees minus the stair stepping angle (referred to as a second threshold angle). Planar surfaces which satisfy this condition represent planar surfaces in the low stair stepping category (referred to as case 2 in FIG. 5). For planar surfaces for which the angle between the planar surface and the reference plane of the additive manufacturing apparatus is greater than the second threshold angle, the area of the planar surface is calculated at block 536. At block 538 the areas of all planar surfaces for which the angle between the planar surface and the reference plane of the additive manufacturing apparatus is greater than the second threshold angle are summed.

When there are no more planar surfaces to process, the algorithm 500 moves to block 540. At block 540, the algorithm receives weightings for the high stair stepping (case 1) and low stair stepping (case 2) cases and calculates a weighted arithmetic mean of the summed areas.

Applying the weightings allows the algorithm 500 to place greater importance to the areas with high stair stepping. For example, by giving high stair stepping areas a higher weight in the algorithm 500, the algorithm 500 will choose, between two orientations with the same area affected by stair stepping, the orientation with a higher proportion of low stair stepping areas and a low proportion of high stair stepping areas.

At block 544, the weighted arithmetic mean of the summed areas (referred to as a second weighted arithmetic mean) is compared with a weighted arithmetic mean of the summed areas calculated for a previously determined best orientation (referred to as a first weighted arithmetic mean).

At block 546, a determination is made as to whether the area of the second weighted arithmetic mean is smaller than the area of the first weighted arithmetic mean. In other words, at block 546 the algorithm 500 determines whether there is a reduction in the area of the object affected by stair stepping if the object is manufactured in a current orientation as compared to a previous best candidate orientation.

If there is not a reduction in the area of the object affected by stair stepping, the algorithm may, at block 548, determine if the first and second weighted arithmetic mean areas are equal. In response to determining that the areas are equal, the algorithm 500 may at block 550 determine whether a height of the object in the second orientation (i.e. the vertical extent of the object while being manufactured) is smaller than the height of the object in the first orientation (i.e. the previous best candidate orientation). If the height of the object in the second orientation is smaller than the height of the object in the first orientation, the second orientation may be stored as a new best candidate orientation. If not, then the algorithm 500 may return to block 512 to process the object data again with the object in a new orientation. In particular, the object data may be processed to define the plurality of planar surfaces in a third object orientation (block 520), different to the first object orientation and the second object orientation. Blocks 522 to 548 may then be repeated for the new orientation to determine, based on the plurality of planar surfaces in the third object orientation, a third area of the object affected by stair stepping.

In response to determining that the second weighted arithmetic mean is greater than the first weighted arithmetic mean, the algorithm may return to block 512.

In response to determining that the second weighted arithmetic mean is less than the first weighted arithmetic mean, the algorithm 500 moves to block 552 where a determination is made as to whether the difference between the first weighted arithmetic mean and the second weighted arithmetic mean is greater than a threshold reduction value 554. The threshold reduction value 554 represents a reduction in area affected by stair stepping below which the algorithm 500 considers not significant enough to be beneficial. This purpose of this threshold reduction value 554 is to avoid selection of a manufacturing orientation which provides a small improvement in terms of reducing an amount of stair stepping but at a cost of a large increase in the height of the object during manufacture (and the associated increase in material costs and manufacture time).

In response to determining that the difference between the first weighted arithmetic mean and the second weighted arithmetic mean is greater than the threshold reduction value, the algorithm moves to block 556 where a determination is made as to whether a two-dimensional extent of the object parallel to the plane of the reference surface is less than an area threshold 558. The area threshold 558 defines a maximum area of the additive manufacturing apparatus that is to be used for manufacture of the object. The purpose of this area threshold 558 is to ensure the thermal stability of the manufacture process during manufacture of the object by ensuring that the area of the platen 108 that is used (i.e.

on which layers of the three-dimensional object are build) is within the capability of the apparatus to uniformly fuse build material.

In response to determining that the two-dimensional extent of the object parallel to the plane of the reference surface is less than the area threshold 558, the current orientation (i.e. the second object orientation) is stored in memory as a new best candidate object orientation.

However, if at block 552 it is determined that that the difference between the first weighted arithmetic mean and the second weighted arithmetic mean is not greater than the threshold reduction value, the algorithm 500 moves to block 560. At block 560, a determination is made as to whether the height of the object (in the current, second, orientation) is less than a height threshold value 562. The purpose of this is to enable the possibility for the algorithm 500 to select candidate orientations which may not provide a large improvement over other candidate orientations in terms of reducing stair stepping but may provide a significant reduction in material costs and manufacture time by reducing the overall height of the object during manufacture. Accordingly, in response to determining at block 560 that the height (i.e. an extent of the object in a direction perpendicular to the plane of the reference surface) is less than the height threshold 562, the algorithm 500 may move to block 556 described above.

In some examples, the algorithm 500 may omit certain blocks. For example, the algorithm 500 may not necessarily consider the angle between the planar surface and the reference plane of the additive manufacturing apparatus by, for example, omitting blocks 522 to 552 and progressing directly from block 520 to block 560. In other examples, the algorithm 500 may be amended to omit block 560. In other examples, the algorithm 500 may be amended to omit block 556.

In some examples, other properties affecting the final object may be considered instead of the properties considered by the algorithm 500. Such properties may be considered instead of or as well as the properties considered by the algorithm 500 shown in FIG. 5. For example, the algorithm may calculate a value related to a tensile strength of the manufactured object for each respective object orientation and select a manufacturing orientation of the object partly on the basis of the values of tensile strength. For example, in some examples, the tensile strength of a manufactured object may be higher in the plane in which the build material is deposited (i.e. the x-y plane) and the algorithm 500 may accordingly select the manufacturing orientation to increase the tensile strength.

In some examples, the algorithm 500 may also receive data indicating processes that are to be applied to the object after the additive manufacturing process. Such post-process may affect the final dimensions of the object and so by considering the post-processing at the design stage, the algorithm 500 can compensate for changes to the dimensions of the object caused by post-processes.

For example, the algorithm 500 may be able to receive data input by the designer to specify that, after the additive manufacturing process, the part will receive a treatment that will add an additional thickness to the finished object. For example, the designer may specify to the algorithm 500 that the part is to be painted and may be able to specify a thickness of the paint (for example 0.2 mm). The algorithm 500 may then be arranged to compensate for the painting process by applying an offset of 0.2 mm to all external surfaces of the object.

In another example, the designer may specify that the part is to be electroplated and may be able to specify that the electroplating process will add a thickness of, for example, 0.1 mm. The algorithm 500 may then be arranged to compensate for the painting process by applying an offset of 0.1 mm to all external surfaces of the object.

In another example, the designer may specify that the part is to be dyed following the additive manufacture process and may specify that as a result of water absorption during the dying process the object will expand by a certain amount (for example 0.05%). The algorithm 500 may then be arranged to compensate for the dyeing process by scaling the dimensions of the object by a corresponding amount.

In other examples, the object may be subjected to processes after the additive manufacturing process, which reduce the dimensions of the object. For example, the object may be subjected to a tumbler process (for example, to remove burrs or other unwanted surface features). The designer may specify that the part is to be subjected to such a process and may specify an expected reduction in the dimensions of the object (for example, that the external surface with be reduced in thickness by 0.05 mm. The algorithm 500 may then be arranged to apply an offset increase in the dimensions of the object to compensate for the expected reduction.

Figure 6:
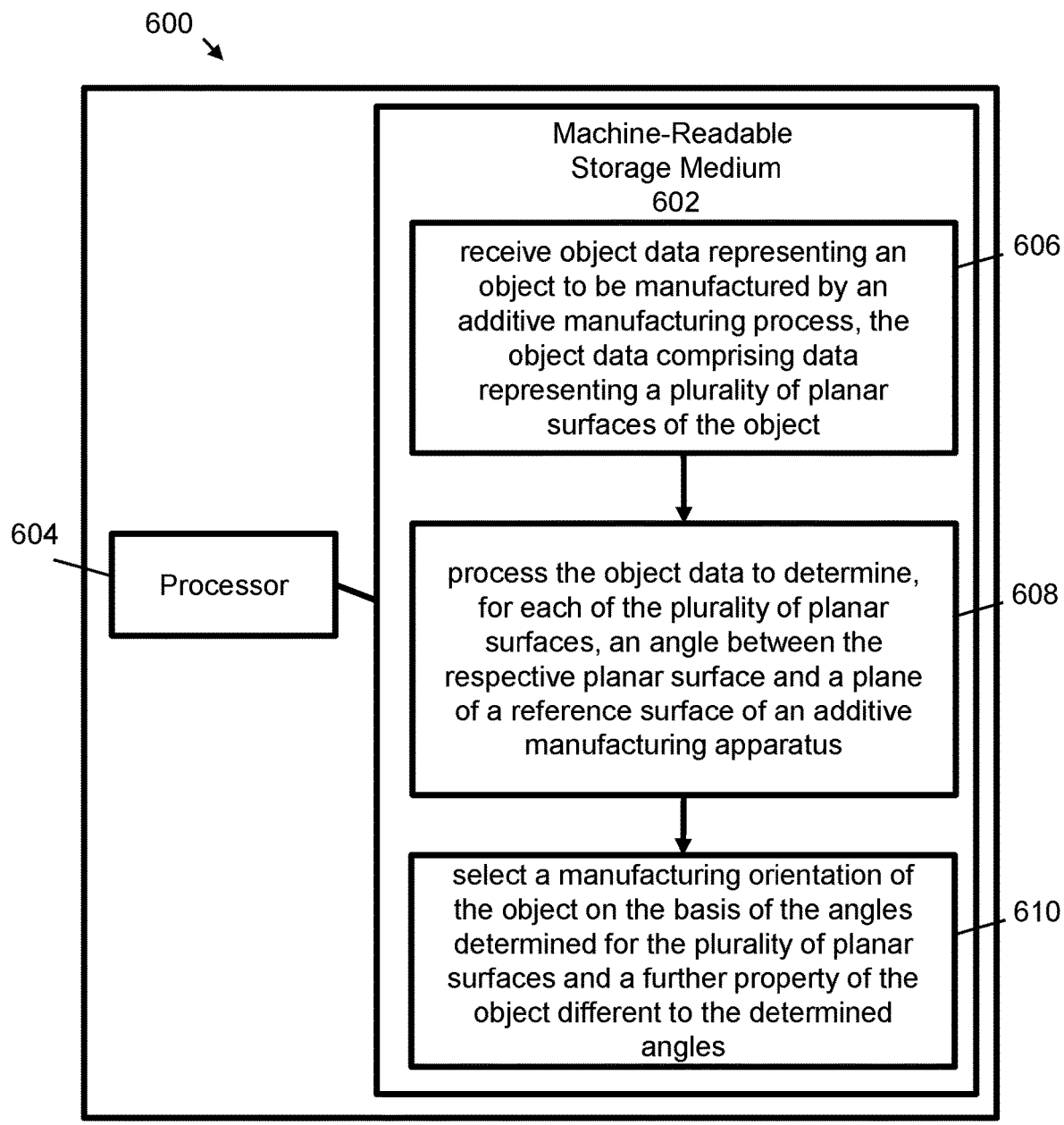
FIG. 6 is a schematic diagram showing a processing device according to an example.

Certain methods and systems as described herein may be implemented by a processor that processes computer program code that is retrieved from a non-transitory storage medium. For example, the method 200, the method 300 and the method 400 described above with reference to FIGS. 2, 3, and 4 may be implemented by computer program code that is implemented by a computing device, including a processor of a computing system embedded in a printing device. In this context, FIG. 6 shows an example of a processing device 600 comprising a machine-readable storage medium 602 coupled to a processor 604. In certain case the processing device 604 may comprise a stand-alone computing device, such as a desktop computer or server communicatively coupled to an imaging device; in other cases the processing device 604 may comprise part of an additive manufacturing apparatus, such as the manufacturing apparatus 100 described above with reference to FIG. 1. The machine-readable medium 602 can be any medium that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 6, the machine-readable storage medium 602 comprises program code to implement the method 200 described above with reference to FIG. 2. However, the program code may be to implement any of the methods described above.

At block 606, object data representing an object to be manufactured by an additive manufacturing process is received. The object data comprises data representing a plurality of planar surfaces of the object. For example, the object data may be in the form of a stereolithography file. Such a file may comprise data representing a plurality of triangular segments which combine to form a surface of a three-dimensional object to be manufactured.

At block 608, the object data is processed to determine, for each of the plurality of planar surfaces, an angle between the respective planar surface and a plane of a reference surface of the additive manufacturing apparatus. For example, the reference surface of the additive manufacturing apparatus may be the platen 108 upon which the object 110 is to be manufactured.

At block 610, a manufacturing orientation of the object is selected on the basis of the angles determined for the plurality of planar surface and a further property of the object different to the determined angles. For example, the further property of the object may be one or more of: an extent of the object in a direction perpendicular to a plane of a reference of an additive manufacturing apparatus when the object has a respective orientation; a two-dimensional extent of the object parallel to the plane of the reference surface when the object has a respective orientation; and a tensile strength of the object in a direction parallel to the plane of the reference surface when the object has a respective orientation.

In some examples, the processor may process the object data to define the plurality of planar surfaces in a first object orientation and determine a first area of the object affected by stair stepping based on the plurality of planar surfaces in the first object orientation. The processor may then process the object data to define the plurality of planar surfaces in a second object orientation and determine a second area of the object affected by stair stepping based on the plurality of planar surfaces in the first object orientation. The processor may then select the manufacturing orientation of the object (i.e. the orientation with respect to the platen 108) based on which of the first and second areas is lower.

In some examples, the processor may process the object data to define the plurality of planar surface is more than two object orientations and may select the manufacturing orientation based on which of a plurality of orientations results in a lowest area affected by stair stepping.

In the methods and algorithms described above with reference to FIGS. 2 to 6, each of the properties based on which the algorithm is selected may be assigned a weight corresponding to its relevant importance. This weight may be, for example, reflected as threshold values such as the various thresholds defined in relation to the algorithm 500 described above with reference to FIG. 5.

The preceding description has been presented to illustrate and describe examples of the principles described. This description is not intended to be exhaustive or to limit these principles to any precise form disclosed. Many modifications and variations are possible in light of the above teaching. For example, although the preceding description has been presented with reference to an additive manufacturing apparatus that uses a fusing agent that absorbs electromagnetic radiation to cause build material to fuse, in other examples, the fusing agent may be a chemical binding agent. In other examples, the additive manufacturing apparatus may use no fusing agent and may instead fuse build material by directly applying focused energy from, for example, a laser beam or an electron beam.

It is to be understood that any feature described in relation to any one example may be used alone, or in combination with other features described, and may also be used in combination with any features of any other of the examples, or any combination of any other of the examples.

What is claimed is:

1. A non-transitory machine-readable storage medium storing instructions that, when executed by a processor, cause the processor to:
receive object data representing an object to be manufactured by an additive manufacturing process, the object data comprising data representing a plurality of planar surfaces of the object;
process the object data to define the plurality of planar surfaces in a first object orientation;
determine, based on the plurality of planar surfaces in the first object orientation, a first area of the object affected by stair stepping;
process the object data to define the plurality of planar surfaces in a second object orientation different to the first object orientation;
determine, based on the plurality of planar surfaces in the second object orientation, a second area of the object affected by stair stepping;
process the object data to determine, for each of the plurality of planar surfaces, an angle between the respective planar surface and a plane of a build platen; and
select a manufacturing orientation of the object on the basis of the angles determined for the plurality of planar surfaces, which of the first area and the second area is lower in height, and a tensile strength of the object in a direction parallel to the plane of the build platen when the object has a respective orientation.

2. A non-transitory machine-readable storage medium according to claim 1, storing instructions that, when executed by a processor, cause the processor to:
determine, for each of the plurality of planar surfaces, whether the angle between the respective planar surface and the plane of the build platen of the additive manufacturing apparatus is less than a first threshold angle or is greater than a second threshold angle, wherein the second threshold angle is equal to 180 degrees minus the first threshold angle; and
sum the areas of the plurality of planar surfaces for which the angle is determined to be less than the first threshold angle or greater than a second threshold angle.

3. A non-transitory machine-readable storage medium according to claim 2, storing instructions that, when executed by a processor, cause the processor to:
apply a first weighting to areas of the plurality of planar surfaces for which the determined angle is less than the first threshold angle and a second weighting to areas of the plurality of planar surfaces for which the determined angle is greater than the second threshold angle; and
calculate a weighted arithmetic mean of the summed areas of the plurality of planar surfaces for which the angle is determined to be less than the first threshold angle or greater than a second threshold angle.

4. A non-transitory machine-readable storage medium according to claim 2, storing instructions that, when executed by a processor, cause the processor to:
calculate a first weighted arithmetic mean of the area of the plurality of planar surfaces for which, in a first object orientation, the angle is determined to be less than the first threshold angle or greater than the second threshold angle;
calculate a second weighted arithmetic mean of the area of the plurality of planar surfaces for which, in a second object orientation, the angle is determined to be less than the first threshold angle or greater than the second threshold angle; and
compare the first weighted arithmetic mean with the second weighted arithmetic mean.

5. A non-transitory machine-readable storage medium according to claim 4, storing instructions that, when executed by a processor, cause the processor to:
  in response to determining that the second weighted arithmetic mean is greater than the first weighted arithmetic mean, process the object data to define the plurality of planar surfaces in a third object orientation, different to the first object orientation and the second object orientation;
  determine, based on the plurality of planar surfaces in the third object orientation, a third area of the object affected by stair stepping; and
  store in memory a candidate object orientation of the object based on which of the first and third areas is lower.

6. A non-transitory machine-readable storage medium according to claim 4, storing instructions that, when executed by a processor in, cause the processor to:
  in response to determining that the second weighted arithmetic mean is less than the first weighted arithmetic mean, determine whether the difference between the first weighted arithmetic mean and the second weighted arithmetic mean is greater than a threshold reduction value.

7. A non-transitory machine-readable storage medium according to claim 6, storing instructions that, when executed by a processor, cause the processor to:
  in response to determining that the difference between the first weighted arithmetic mean and the second weighted arithmetic mean is greater than the threshold reduction value, determine whether a two-dimensional extent of the object parallel to the plane of the build platen is less than an area threshold; and
  in response to determining that the two-dimensional extent of the object parallel to the plane of the build platen is less than the area threshold, store in memory a candidate object orientation corresponding to the second object orientation.

8. A non-transitory machine-readable storage medium according to claim 6, storing instructions that, when executed by a processor, cause the processor to:
  in response to determining that the difference between the first weighted arithmetic mean and the second weighted arithmetic mean is less than or equal to the threshold reduction value, determine whether an extent of the object in a direction perpendicular to the plane of the build platen is less than a height threshold; and
  in response to determining that the extent of the object in a direction perpendicular to the plane of the build platen is less than a height threshold, determine whether a two-dimensional extent of the object parallel to the plane of the build platen is less than an area threshold; and
  in response to determining that the two-dimensional extent of the object parallel to the plane of the build platen is less than the area threshold, store in memory a candidate object orientation corresponding to the second object orientation.

9. A non-transitory machine-readable storage medium according to claim 1, storing instructions that, when executed by a processor, cause the processor to:
  receive post-processing data indicative of a process to be applied to the object after an additive manufacturing process; and
  modify the object data to modify one or more dimensions of the object to be formed by the additive manufacturing apparatus on the basis of the post-processing data.

10. Apparatus to produce a three-dimensional object, the apparatus being to:
  receive object data representing an object to be manufactured by an additive manufacturing process, the object data comprising data representing a plurality of planar surfaces of the object;
  process the object data to define the plurality of planar surfaces in a first object orientation;
  determine, based on the plurality of planar surfaces in the first object orientation, a first area of the object affected by stair stepping;
  process the object data to define the plurality of planar surfaces in a second object orientation different to the first object orientation;
  determine, based on the plurality of planar surfaces in the second object orientation, a second area of the object affected by stair stepping;
  process the object data to determine, for each of the plurality of planar surfaces, an angle between the respective planar surface and a plane of a build platen; and
  select a manufacturing orientation of the object on the basis of the angles determined for the plurality of planar surfaces, which of the first area and the second area is lower in height, and a tensile strength of the object in a direction parallel to the plane of the build platen when the object has a respective orientation.

11. A method of selecting a manufacturing orientation of an object to be formed by an additive manufacturing apparatus, the method comprising:
  receiving object data representing the object to be manufactured by the additive manufacturing process, the object data comprising data representing a plurality of planar surfaces of the object;
  processing the object data to define the plurality of planar surfaces in a first object orientation;
  determining, based on the plurality of planar surfaces in the first object orientation, a first area of the object affected by stair stepping;
  processing the object data to define the plurality of planar surfaces in a second object orientation different to the first object orientation;
  determining, based on the plurality of planar surfaces in the second object orientation, a second area of the object affected by stair stepping;
  processing the object data to determine, for each of the plurality of planar surfaces, an angle between the respective planar surface and a plane of a build platen; and
  selecting a manufacturing orientation of the object on the basis of the angles determined for the plurality of planar surfaces, which of the first area and the second area is lower in height, and a tensile strength of the object in a direction parallel to the plane of the build platen when the object has a respective orientation.

12. A method according to claim 11, comprising:
  receiving post-processing data indicative of a process to be applied to the object after the additive manufacturing process; and
  modifying the object data to modify one or more dimensions of the object to be formed by the additive manufacturing apparatus on the basis of the post-processing data.

13. A method according to claim 12, wherein the process to be applied to the object after an additive manufacturing process comprises one or more of:
  a painting process;

an electroplating process;
a dyeing process; and
a tumbler process.

14. A non-transitory machine-readable storage medium according to claim 9, wherein the process to be applied to the object after the additive manufacturing process comprises one or more of:
a painting process;
an electroplating process;
a dyeing process; and
a tumbler process.

15. A non-transitory machine-readable storage medium according to claim 1, wherein the manufacturing orientation of the object is further selected on the basis of a dimensional extent of the object, and wherein the instructions are further to determine areas of the object affected by the stair stepping for different candidate object orientations and select the manufacturing orientation of the object based on one of the candidate object orientations with a lower area than another of the candidate object orientations.

* * * * *